(12) United States Patent
Yoshikawa

(10) Patent No.: US 9,739,967 B2
(45) Date of Patent: Aug. 22, 2017

(54) WIRING MEMBER

(71) Applicant: SUMITOMO ELECTRIC INDUSTRIES, LTD., Osaka-shi, Osaka (JP)

(72) Inventor: Satoshi Yoshikawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/182,789

(22) Filed: Jun. 15, 2016

(65) Prior Publication Data

US 2016/0372236 A1  Dec. 22, 2016

(30) Foreign Application Priority Data

Jun. 18, 2015  (JP) .................. 2015-122574

(51) Int. Cl.
| | |
|---|---|
| G02B 6/00 | (2006.01) |
| G02B 6/44 | (2006.01) |
| G02B 6/42 | (2006.01) |
| H02G 15/10 | (2006.01) |
| H01B 11/18 | (2006.01) |

(52) U.S. Cl.
CPC ......... *G02B 6/4439* (2013.01); *G02B 6/4472* (2013.01); *G02B 6/4284* (2013.01); *H01B 11/1895* (2013.01); *H02G 15/10* (2013.01)

(58) Field of Classification Search
CPC .. G02B 6/4439; G02B 6/4471; G02B 6/4472; G02B 6/4475; H02G 15/10; H02G 15/113

USPC .................................. 385/136, 137, 147
See application file for complete search history.

(56) References Cited

U.S. PATENT DOCUMENTS

| | | | | | |
|---|---|---|---|---|---|
| 5,472,160 | A | * | 12/1995 | Burek .................. | G02B 6/4471 24/134 P |
| 5,915,055 | A | * | 6/1999 | Bennett ................ | G02B 6/2551 385/100 |
| 6,434,315 | B1 | * | 8/2002 | Grois ................... | G02B 6/3885 385/139 |
| 6,466,725 | B2 | * | 10/2002 | Battey ................. | G02B 6/4497 385/100 |
| 6,816,663 | B2 | * | 11/2004 | Daoud ................. | G02B 6/4471 385/136 |
| 7,054,536 | B2 | * | 5/2006 | Sun ..................... | G02B 6/4476 385/114 |

(Continued)

*Primary Examiner* — Robert Tavlykaev
(74) *Attorney, Agent, or Firm* — Drinker Biddle & Reath LLP

(57) ABSTRACT

A wiring member comprises a first module having a first communication unit, second modules having respective second communication units, a cable module having cables which connect the first communication unit to the second communication units, and a branching module which is disposed at a prescribed position in the cable module. The branching module has a first cable insertion portion in which the cables are inserted in bundled form and a second cable insertion portion in which the cables are inserted separately, and the branching module is fixed to at least one of the cables in a first state and is made movable relative to the cables in a second state. One end portions of the cables are connected to the first module in bundled form and the other end portions of the cables are connected to the respective second modules separately.

9 Claims, 11 Drawing Sheets

(56) References Cited

U.S. PATENT DOCUMENTS

| | | | | |
|---|---|---|---|---|
| 8,172,465 | B2* | 5/2012 | Kleeberger | G02B 6/4472 385/134 |
| 8,842,961 | B2* | 9/2014 | Thackston | G02B 6/4471 385/137 |
| 9,140,872 | B2* | 9/2015 | Sedor | G02B 6/4472 |
| 2014/0363171 | A1 | 12/2014 | Tang et al. | |
| 2014/0369347 | A1 | 12/2014 | Orsley | |
| 2015/0295394 | A1* | 10/2015 | Byczkiewicz | H02G 15/113 174/72 C |
| 2015/0323742 | A1* | 11/2015 | Baker | G02B 6/28 385/24 |
| 2015/0370029 | A1* | 12/2015 | Petersen | G02B 6/4471 385/114 |
| 2016/0124174 | A1* | 5/2016 | Courchaine | G02B 6/4471 385/137 |

* cited by examiner

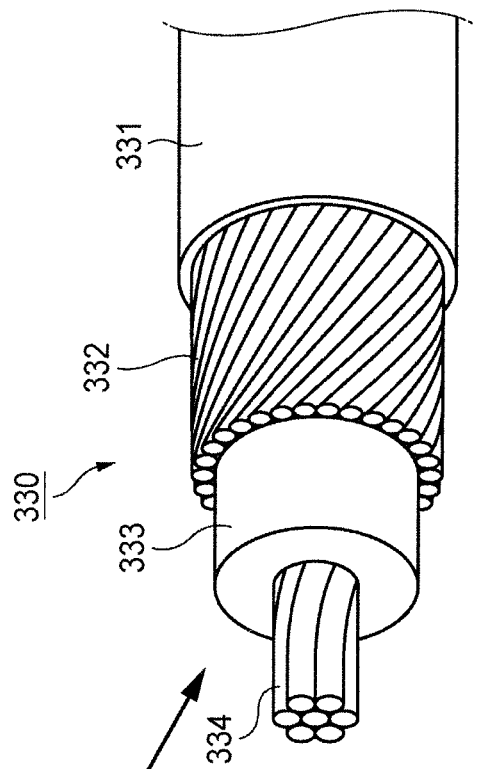
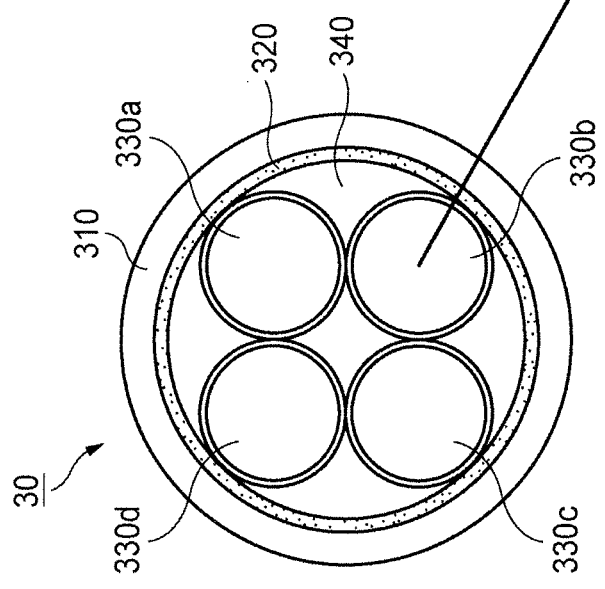
FIG. 2A
FIG. 2B

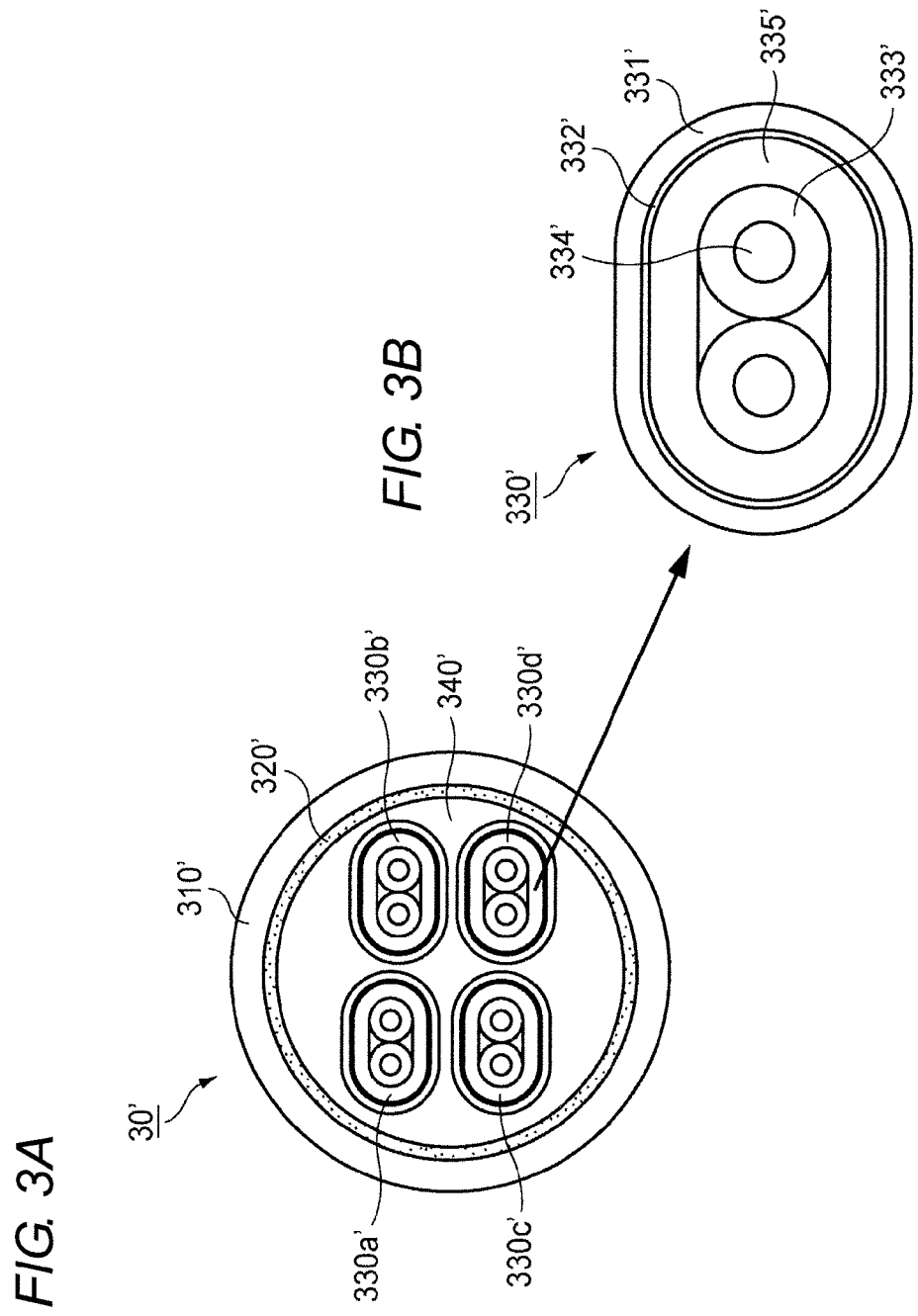

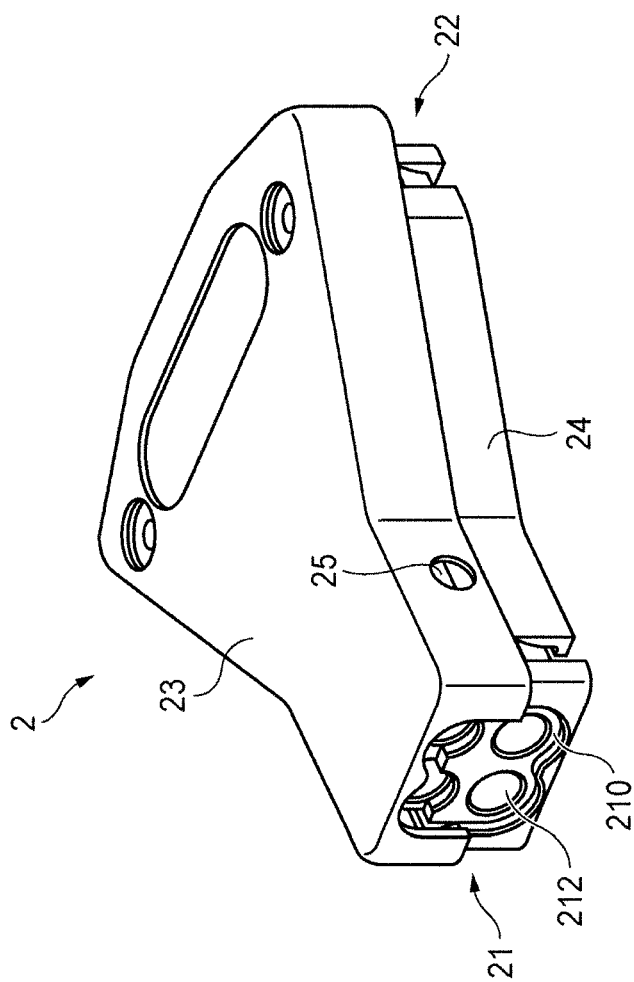
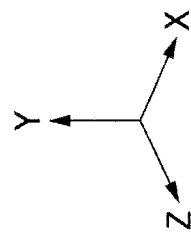
FIG. 6

FIG. 9
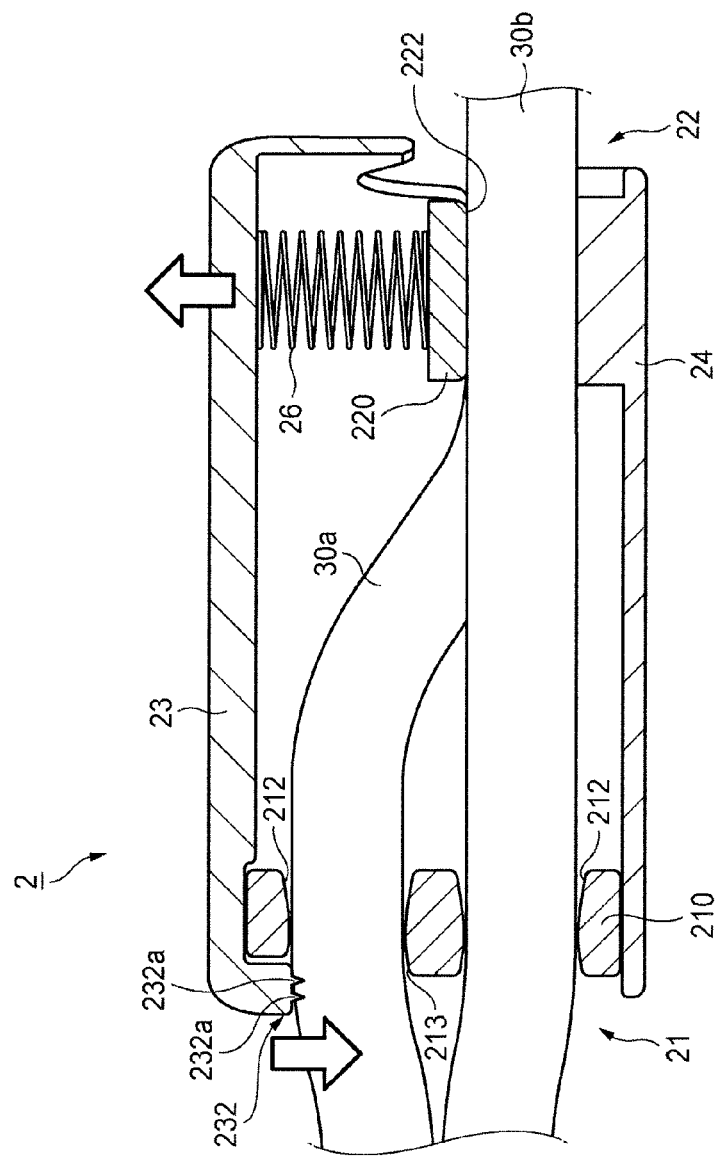
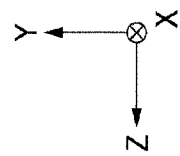

WIRING MEMBER

CROSS-REFERENCE TO RELATED APPLICATION

The present application claims the benefit of priority of Japanese Patent Application No. 2015-122574, filed on Jun. 18, 2015, which is incorporated herein by reference.

BACKGROUND

Technical Field

The present invention relates to a wiring member.

Related Art

In recent years, with the increase of communication capabilities, the number of cables that connect boards in data centers in which computers such as servers and communication apparatus are installed has been increasing rapidly. Breakout cables as cables for connecting boards are disclosed in, for example, US 2014/0369347 A and US 2014/0363171 A.

US 2014/0369347 A discloses a breakout cable in which a QSFP (quad small form-factor pluggable) module for 40-Gbps transmission branches into four SFP (small form-factor pluggable) modules each for 10-Gbps transmission via metal cables.

US 2014/0363171 A discloses a breakout cable in which a QSFP terminal for 40-Gbps transmission branches into four RJ (registered jack)-45 terminals each for 10-Gbps transmission via optical cables or metal cables.

However, in the breakout cables disclosed in US 2014/0369347 A and US 2014/0363171 A, a branching position of a cable module consisting of plural cables is set in advance and cannot be changed. As a result, the length of separated cables cannot be adjusted according to a positional relationship between boards.

SUMMARY

An object of the present invention is to provide a wiring member in which the branching position of a cable module is adjustable.

One aspect of the invention provides a wiring member comprising:
- a first module having a first communication unit which is electrically connected to a first host apparatus;
- plural second modules having respective second communication units which are electrically connected to a second host apparatus;
- a cable module having plural cables which connect the first communication unit to the second communication units; and
- a branching module which is disposed at a prescribed position in the cable module, which has a first cable insertion portion in which the plurality of cables are inserted in bundled form and a second cable insertion portion in which the plurality of cables are inserted separately, and which is fixed to at least one of the plurality of cables in a first state and is made movable relative to the plurality of cables in a second state, wherein:
- one end portions of the plurality of cables are connected to the first module in bundled form and the other end portions of the plurality of cables are connected to the respective second modules separately.

In this wiring member, the position of the branching module can be changed according to a positional relationship between the first host apparatus and the second host apparatus. Thus, a wiring member can be provided in which the branching position of a cable module is adjustable.

BRIEF DESCRIPTION OF THE DRAWINGS

FIG. 2A is a sectional view, taken perpendicularly to the longitudinal direction, of a micro coaxial cable, and FIG. 2B is a perspective view of one of plural signal cables provided in the cable of FIG. 2A;

FIG. 3A is a sectional view, taken perpendicularly to the longitudinal direction, of a twinax cable, and FIG. 3B is a perspective view of one of plural signal cables provided in the cable of FIG. 3A;

FIG. 6 is a perspective view of a branching module;

FIG. 9 is a sectional views taken perpendicularly to the X-axis direction and showing the branching module being in a first state.

DETAILED DESCRIPTION

Outline of Embodiment of the Invention

Figure 1A:
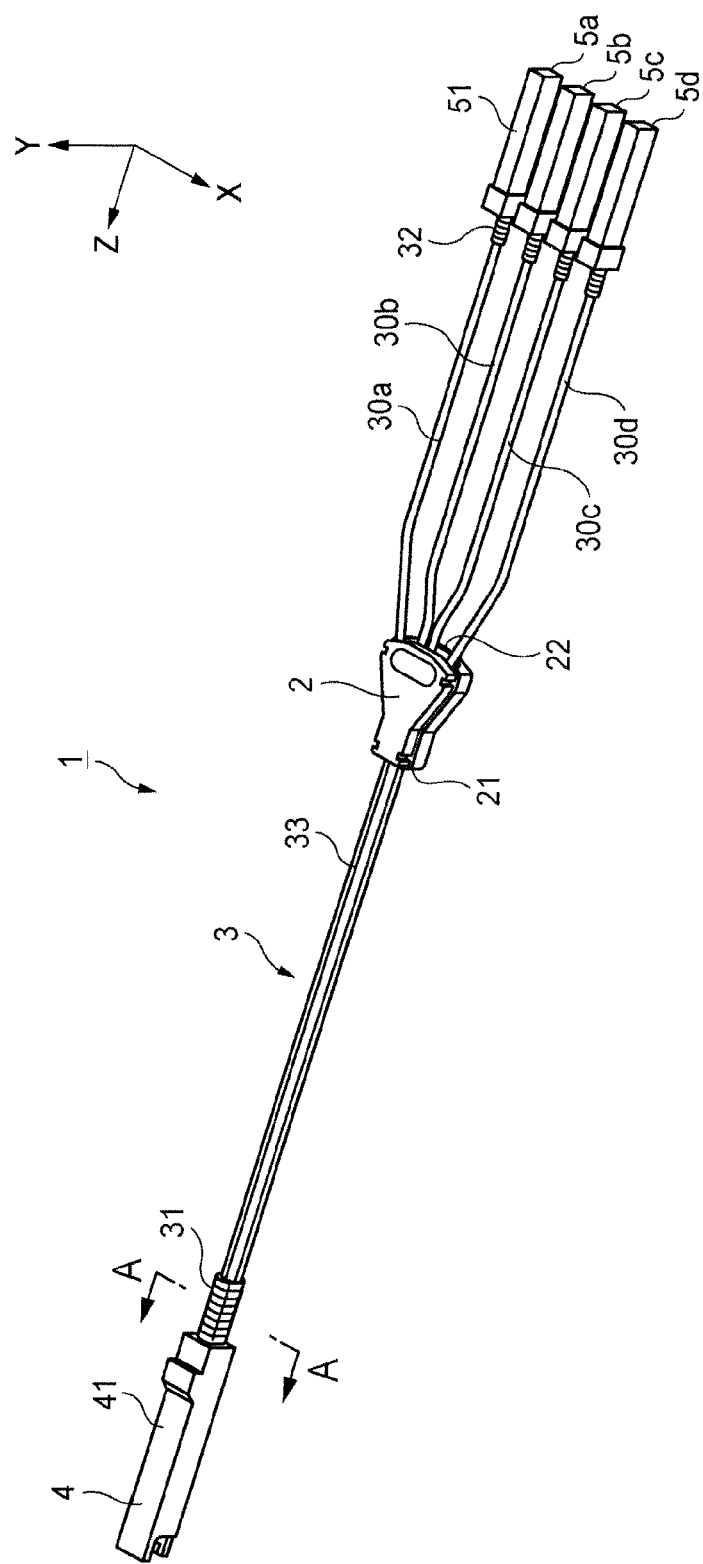
FIG. 1A is a schematic view of the wiring member 1 according to an embodiment of the present invention.

An embodiment of the present invention will be outlined below:

(1) A wiring member comprising:
- a first module having a first communication unit which is electrically connected to a first host apparatus;
- plural second modules having respective second communication units which are electrically connected to a second host apparatus;
- a cable module having plural cables which connect the first communication unit to the second communication units; and
- a branching module which is disposed at a prescribed position in the cable module, which has a first cable insertion portion in which the plurality of cables are inserted in bundled form and a second cable insertion portion in which the plurality of cables are inserted separately, and which is fixed to at least one of the plurality of cables in a first state and is made movable relative to the plurality of cables in a second state, wherein:
- one end portions of the plurality of cables are connected to the first module in bundled form and the other end portions of the plurality of cables are connected to the respective second modules separately.

With this configuration, the position of the branching module can be changed according to a positional relationship between the first host apparatus and the second host apparatus. Thus, a wiring member can be provided in which the branching position of a cable module is adjustable.

(2) The wiring member according to item (1), wherein the branching module further comprises an elastic member, and the branching module is fixed to at least one of the plurality of cables by elastic force of the elastic member.

With this configuration, the branching module can be rendered in the first state by the elastic force of the elastic member.

(3) The wiring member according to item (2), wherein:
the branching module further comprises:
- a fixed cover;
- a movable cover; and
- a rotation point which is disposed between the first cable insertion portion and the second cable insertion portion and connect the movable cover to the fixed cover rotatably;
- the elastic member is disposed between the movable cover and the fixed cover; and
- the movable cover is fixed to the at least one of the plurality of cables by elastic force of the elastic member.

With this configuration, the branching module can be rendered in the first state when the movable cover is fixed to the at least one of the plurality of cables by the elastic force of the elastic member.

(4) The wiring member according to item (3), wherein:
- the elastic member is disposed between the rotation point and the second cable insertion portion; and
- the movable cover is fixed to the at least one of the plurality of cables when the elastic member expands, and is made movable relative to the plurality of cables when the elastic member is contracted.

With this configuration, the movable cover is fixed to the at least one of the plurality of cables when the elastic member expands, and is made movable relative to the plurality of cables when the elastic member is contracted. Thus, the movable module can be switched from the first state to the second state by a simple manipulation of pushing a portion, located on the side of the second cable insertion portion, of the movable cover toward the fixed cover.

(5) The wiring member according to any one of item (4), wherein:
- the first cable insertion portion has a first cable organizer having plural first insertion passages in which the respective cables are inserted; and
- the second cable insertion portion has a second cable organizer having plural second insertion passages in which the respective cables are inserted.

With this configuration, the first and second cable organizers can determine the intervals between the adjoining ones of the separated cables and fix the routes of the respective cables in the branching module. As a result, the plurality of cables are not entangled with each other even when the branching module is moved relative to the plurality of cables.

(6) The wiring member according to any one of item (5), wherein:
- the plurality of cables are inserted in the first cable insertion portion in such a manner as to be bundled together in two stages.

(7) The wiring member according to item (6), wherein:
- the first cable organizer has a step portion that is continuous with at least one of the plurality of first insertion passages; and
- the at least one of the plurality of cables is fixed to the movable cover so as to be sandwiched between the movable cover and the step portion.

With this configuration, since the at least one of the plurality of cables is fixed to the movable cover so as to be sandwiched between the movable cover and the step portion, the branching module can be fixed to the cables securely.

(8) The wiring member according to any one of item (6), wherein:
- the plural first insertion passages are arranged in two stages;
- the plural second insertion passages are arranged in one stage;
- the plurality of second insertion passages are in contact with the fixed cover; and
- the elastic member is disposed between the movable cover and the second cable organizer.

With this configuration, the first insertion passages of the first cable organizer are arranged in two stages and the second insertion passages of the second cable organizer are arranged in one stage. As a result, the second cable organizer can be made thinner than the first cable organizer. Furthermore, since the elastic member is disposed between the movable cover and the second cable organizer, the branching module can be miniaturized as a whole.

(9) The wiring member according to item (6), wherein:
- the first cable organizer has a step portion that is continuous with at least one of the plurality of first insertion passages;
- the at least one of the plurality of cables is fixed to the movable cover so as to be sandwiched between the movable cover and the step portion;
- the plural first insertion passages are arranged in two stages;
- the plural second insertion passages are arranged in one stage;
- the plurality of second insertion passages are in contact with the fixed cover; and
- the elastic member is disposed between the movable cover and the second cable organizer.

(10) The wiring member according to item (1), wherein:
the branching module further has:
- a fixed cover;
- a movable cover, and
- an elastic member disposed between the movable cover and the fixed cover, and
- the movable cover is fixed to the at least one of the plurality of cables by elastic force of the elastic member in a state that the plurality of cables are inserted in the respective first insertion passages.

With this configuration, the movable cover is fixed to the at least one of the plurality of cables securely by the elastic force of the elastic member in a state that the plurality of cables are inserted in the respective first insertion passages. As a result, the branching module can be rendered in the first state easily.

(11) The wiring member according to claim 10, wherein:
- the first cable insertion portion has a first cable organizer having plural first insertion passages in which the plurality of respective cables are inserted; and
- the second cable insertion portion has a second cable organizer having plural second insertion passages in which the plurality of respective cables are inserted.

Details of Embodiment of the Invention

The embodiment of the invention will be hereinafter described with reference to the drawings. In the embodiment, descriptions of members that are given the same reference symbols as members that have already been described will be omitted for convenience of description.

And the dimensions of each member shown in a drawing may be different from those of an actual member.

In the embodiment, to facilitate its understanding, the X-axis direction, the Y-axis direction, and the Z-axis direction will be used when necessary, which are relative directions that are set for a wiring member 1 shown in FIG. 1A. Therefore, attention should be paid to the fact that when the wiring member 1 is rotated about a prescribed direction, at least one of the X-axis direction, the Y-axis direction, and the Z-axis direction varies accordingly.

The X-axis direction, the Y-axis direction, and the Z-axis direction mean the +Z direction, the +Y direction, and the +Z direction, respectively, and the opposite directions, that is, the −Z direction, −Y direction, and the −Z direction, will also be used when necessary.

FIG. 1A is a schematic view of the wiring member 1 according to the embodiment of the invention. As shown in FIG. 1A, the wiring member 1 is equipped with a first module 4, plural second modules 5a-5d (may be referred to generically as "second modules 5"), a cable module 3, and a branching module 2.

The first module 4 has a first housing 41 and a first communication unit 42 (see FIG. 4) which is housed in the first housing 41. The first communication unit 42 is electrically connected to a first host apparatus (not shown). The first communication unit 42 may be configured so as to communicate with the first host apparatus at 40 Gbits/s, for example. In this case, as prescribed in an MSA (multi-source agreement), it is preferable that the first module 4 be a QSFP module. The details of the first communication unit 42 will be described later in detail.

Each of the second modules 5a-5d has a second housing 51 and a second communication unit 52 (see FIG. 5) which is housed in the first housing 51. The second communication unit 52 is electrically connected to a second host apparatus (not shown). The second communication unit 52 is configured so as to communicate with the second host apparatus at 10 Gbits/s, for example. In this case, as prescribed in the MSA, it is preferable that each of the second modules 5a-5d be an SFP module. The details of the second communication unit 52 will be described later in detail.

The cable module 3 has plural cables 30a-30d, boots 31 and 32, and a heat-shrinkable tube 33. The cables 30a-30d connect the first communication unit 42 of the first module 4 to the second communication units 52 of the second modules 5a-5d electrically or optically.

More specifically, the cable 30a connects the first communication unit 42 to the second communication unit 52 of the second module 5a. The cable 30b connects the first communication unit 42 to the second communication unit 52 of the second module 5b. The cable 30c connects the first communication unit 42 to the second communication unit 52 of the second module 5c. The cable 30d connects the first communication unit 42 to the second communication unit 52 of the second module 5d.

One end portions of the cables 30a-30d are bundled together and connected to the first module 4, and the other end portions of the cables 30a-30d are connected to the respective second modules 5a-5d separately.

Figure 1B:
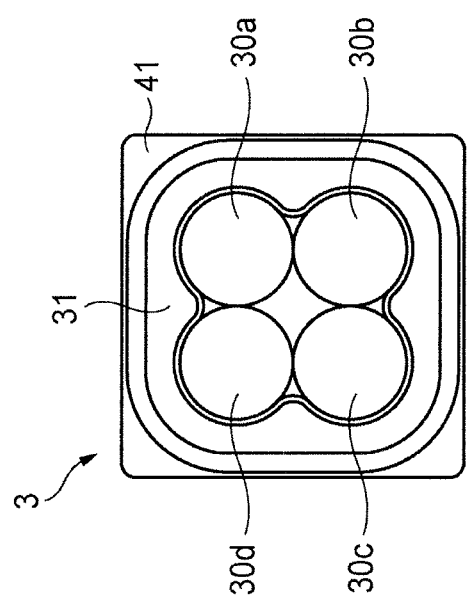
FIG. 1B is a sectional view, taken along line A-A, of a cable module of the wiring member 1 of FIG. 1A.

The boot 31 is disposed close to the end of the first module 4 and is configured so as to bundle the cables 30a-30d. As shown in FIG. 1B, the cables 30a-30d are bundled by the boot 31 in two stages and two rows. The boots 32 are disposed close to the ends of the second modules 5a-5d, respectively. The heat-shrinkable tube 33 is formed so as to fix the cables 30a-30d in bundled form. For example, the bundled cables 30a-30d may be fixed by the heat-shrinkable tube 33 after the branching module 2 has been set at a prescribed position.

The branching module 2 is disposed at a prescribed position in the cable module 3 and is equipped with a first cable insertion portion 21 and a second cable insertion portion 22. The cables 30a-30d are and inserted in the first cable insertion portion 21 in bundled form, and are inserted in the second cable insertion portion 22 separately.

That is, the cables 30a-30d are arranged in such a manner that the interval between the cables 30a and 30d located at the ends in the X-axis direction increases as the position goes from the first cable insertion portion 21 to the second cable insertion portion 22. Whereas the cables 30a-30d are arranged in two stages and two rows in the first cable insertion portion 21, they are arranged in one stage in the second cable insertion portion 22. Among portions, leading out of the second cable insertion portion 22, of the cables 30a-30d, the portions of the cables 30a and 30d extend obliquely with respect to the Z-axis direction. Therefore, the cables 30a-30d extend in the Z-axis direction in such a manner that the interval between the cables 30a and 30d located at the ends in the X-axis direction increases as the position goes from the second cable insertion portion 22 toward the second modules 5.

The branching module 2 is configured so as to be switchable between two states, that is, a first state and a second state. Whereas in the first state the branching module 2 is fixed to at least one of the cables 30a-30d, in the second state the branching module 2 is movable relative to the cables 30a-30d. Thus, in the wiring member 1, the position of the branching module 2 can be changed, that is, the branching position of the cable module 3 can be adjusted, according to a positional relationship between the first host apparatus and the second host apparatus.

The term "bundled cables 30a-30d" does not necessarily mean that the cables 30a-30d are bundled together by the heat-shrinkable tube 33, the boot 31, etc. For example, this term can be construed so as to include a state that the interval between the cables located at the ends in the X-axis direction is smaller than in a branched state.

Next, the details of each of the cables 30a-30d (may be referred to generically as "cables 30") will be described with reference to FIGS. 2A and 2B. FIG. 2A is a sectional view, taken perpendicularly to the longitudinal direction, of a cable 30 that is a micro coaxial cable. FIG. 2B is a perspective view of one of signal cables 330 (a generic term of signal cables 330a-330d) provided in each cable 30.

As shown in FIG. 2A, the cable 30 which is a micro coaxial cable has the plurality of signal cables 330a-330d, a protective layer 340 which covers the signal cables 330a-330d together, an electromagnetic shield layer 320 which covers the signal cables 330a-330d and the protective layer 340, and an outer sheath 310 which covers the shield layer 320. The signal cables 330a-330d are micro coaxial cables. The signal cables 330a-330d are configured in such a manner that each pair of signal cables transmit a positive-phase signal and a negative-phase signal that constitute a differential signal. Since the cable 30 has the four signal cables 330a-330d, two channels each for transmission of a differential signal is formed in the cable 30. One of the two channels is a sending channel and the other is a reception channel.

As shown in FIG. 2B, each signal cable 330 has a center conductor 334 for transmitting a signal, an internal insulating layer 333 which covers the center conductor 334, a shield layer 332 which covers the internal insulating layer 333, and an outer sheath 331 which covers the shield layer 332. The center conductor 334 is formed by twisting seven metal wires together. Having the above structure, the cable 30 of FIGS. 2A and 2B is more flexible than a twinax cable (see FIGS. 3A and 3B).

Next, the details of a twinax cable will be described with reference to FIGS. 3A and 3B. FIG. 3A is a sectional view, taken perpendicularly to the longitudinal direction, of each of the cables (twinax cables) 30a-30d shown in FIG. 3B. For convenience of description, the cables 30a-30d will be referred to as cables 30'. FIG. 3B is a perspective view of one of signal cables 330' (a generic term of signal cables 330a'-330d') provided in each cable 30'.

As shown in FIG. 3A, the cable 30' has the plurality of signal cables 330a'-330d', a protective layer 340' which covers the signal cables 330a'-330d' together, an electromagnetic shield layer 320' which covers the signal cables 330a'-330d' and the protective layer 340', and an outer sheath 310' which covers the shield layer 320'. The signal cables 330a'-330d' are twinax cables. As shown in FIG. 3B, each signal cable 330' is configured in such a manner that a pair of center conductors 334' transmit a positive-phase signal and a negative-phase signal that constitute a differential signal. The cable 30' can transmit two channels of differential signals because the cable 30 has the four signal cables 330a'-330d'. One channel of the channels is a sending channel and the other is a reception channel.

As shown in FIG. 3B, each signal cable 330' has a pair of center conductors 334' for transmitting signals, internal insulating layers 333' which cover the respective center conductors 334', a protective layer 335' which covers the internal insulating layers 333', a shield layer 332' which covers the protective layer 335', and an outer sheath 331' which covers the shield layer 332'.

Figure 4:
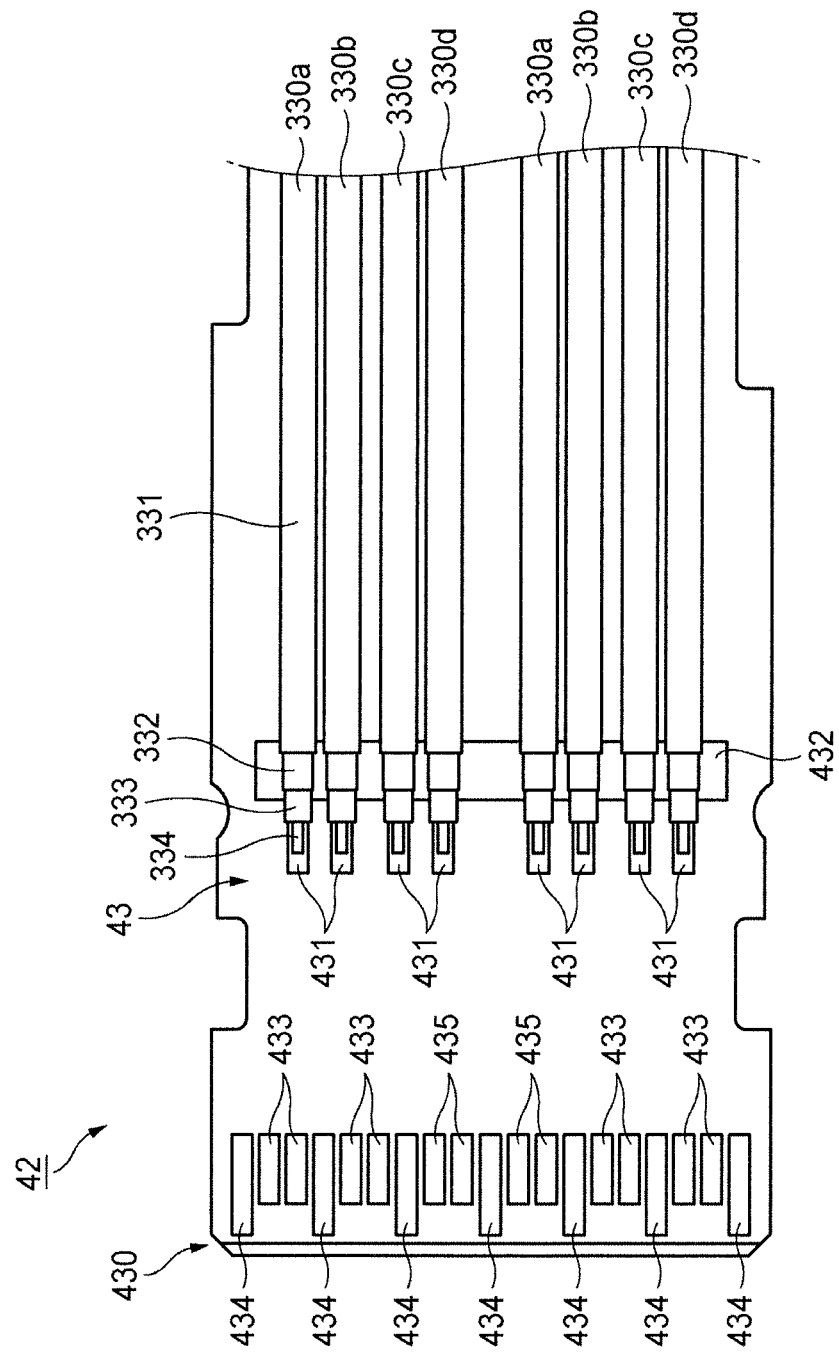
FIG. 4 is a top view of a first communication unit.

Next, the first communication unit 42 of the first module 4 will be described with reference to FIG. 4. FIG. 4 is a top view of the first communication unit 42. As shown in FIG. 4, the first communication unit 42 is equipped with a circuit board (PCB) 43 which is electrically connected to plural signal cables 330a-330d (hereinafter may be referred to simply as "signal cables 330"). The circuit board 43 has a connection portion 430, plural signal pads 431, and a common ground 432. At least part of the connection portion 430 is exposed to the outside from the first housing 41 and is electrically connected to a connector (not shown) of the first host apparatus. The connection portion 430 has plural signal pads 433 for transmission of signals, plural ground pads 434 to be connected to the ground, and plural power lines 435 for supply of power.

The plurality of signal pads 431 are electrically connected to the center conductors 334 of the plurality of signal cables 330, respectively. The common ground 432 is electrically connected to the shield layers 332 of the plurality of signal cables 330. The plurality of signal pads 431 are electrically connected to the respective signal pads 433 via interconnections (not shown) formed on the circuit board 43. Likewise, the common ground 432 is connected to the ground pads 434 via interconnections (not shown). The power lines 435 are electrically connected, via interconnections (not shown), to electronic devices (not shown) mounted on the circuit board 43. Waveform shaping circuits may be formed additionally on the circuit board 43 so as to be connected to part of the above interconnections.

As shown in FIG. 4, eight signal cables 330 are disposed on the top surface of the circuit board 43. The bottom surface of the circuit board 43 has the same structure as its top surface shown in FIG. 4. Therefore, the eight signal cables 330 are disposed on each of the top surface and the bottom surface of the circuit board 43 and hence a total of 16 signal cables 330 are disposed on the circuit board 43. Since as mentioned above one channel for transmitting a differential signal is formed by a pair of signal cables 330, eight channels each for transmitting a differential signal are formed by the 16 signal cables 330. Among the eight channels, four channels are sending channels and the remaining four channels are receiving channels.

The first communication unit 42 may be equipped with E/O converters, each of which is composed of, for example, a light-emitting element and a driver IC. Electrical signals transmitted from the first host apparatus are converted by the E/O converters into optical signals, which are input to part of the signal cables 330. In this case, each signal cable 330 is an optical cable including an optical fiber for transmitting an optical signal and is optically connected to the circuit board 43.

Figure 5:
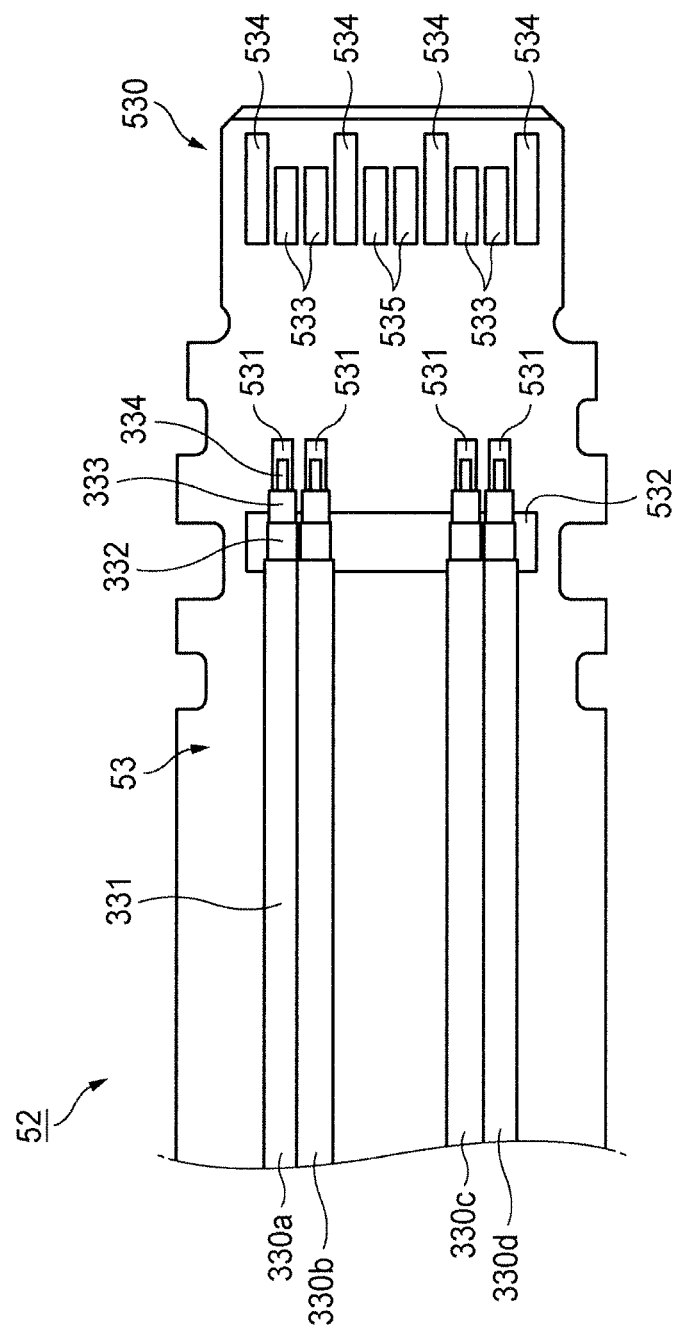
FIG. 5 is a top view of a second communication unit.

Next, the second communication unit 52 of each second module 5 will be described with reference to FIG. 5. FIG. 5 is a top view of the second communication unit 52. As shown in FIG. 5, the second communication unit 52 is equipped with a circuit board (PCB) 53 which is electrically connected to plural signal lines 330a-330d (hereinafter may be referred to simply as "signal cables 330"). The circuit board 53 has a connection portion 530, plural signal pads 531, and a common ground 532. At least part of the connection portion 530 is exposed to the outside from the second housing 51 and is electrically connected to a connector (not shown) of the second host apparatus. The connection portion 530 has plural signal pads 533 for transmission of signals, plural ground pads 534 to be connected to the ground, and plural power lines 535 for supply of power.

The plurality of signal pads 531 are electrically connected to the center conductors 334 of the plurality of signal cables 330, respectively. The common ground 532 is electrically connected to the shield layers 332 of the plurality of signal cables 330. The plurality of signal pads 531 are electrically connected to the respective signal pads 533 via interconnections (not shown) formed on the circuit board 53. Likewise, the common ground 532 is connected to the ground pads 534 via interconnections (not shown). The power lines 535 are electrically connected, via interconnections (not shown), to electronic devices (not shown) mounted on the circuit board 53. Waveform shaping circuits may be formed additionally on the circuit board 53 so as to be connected to part of the above interconnections.

As shown in FIG. 5, four signal cables 330 are disposed only on the top surface of the circuit board 53. Therefore, two channels each for transmitting a differential signal are formed by the four signal cables 330. Among the two channels, one channel is a sending channel and the other channel is a receiving channel.

The second communication unit 52 may be equipped with O/E converters, each of which is composed of, for example, a light-receiving element and a transimpedance amplifier. In this case, each signal cable 330 is an optical cable including an optical fiber and is optically connected to the circuit board 53. Electrical signals transmitted by part of the signal cables 330 are converted by the O/E converters into electrical signals, which are input to the second host apparatus via the connection portion 530.

Figure 7:
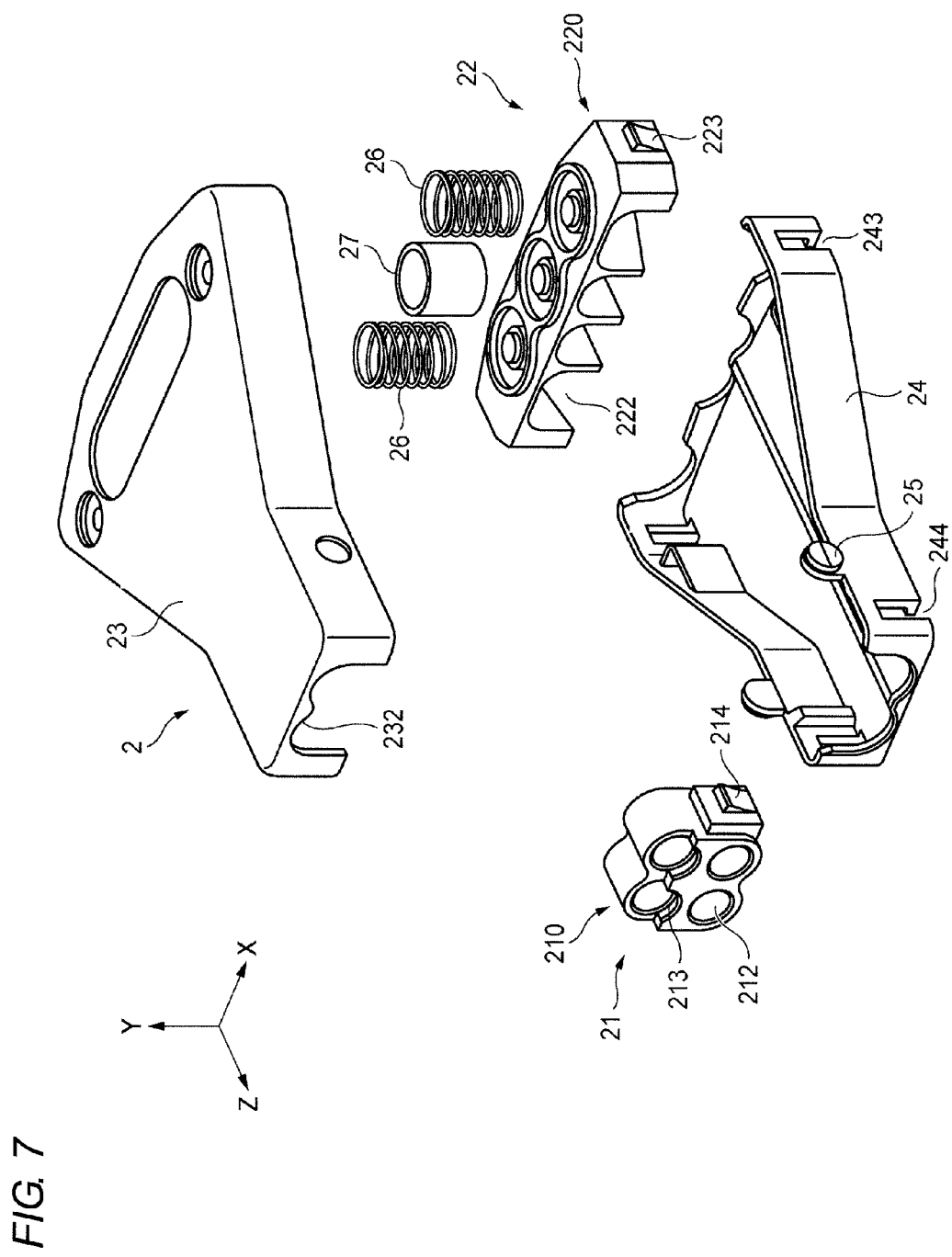
FIG. 7 is an exploded perspective view of the branching module.
Figure 8:
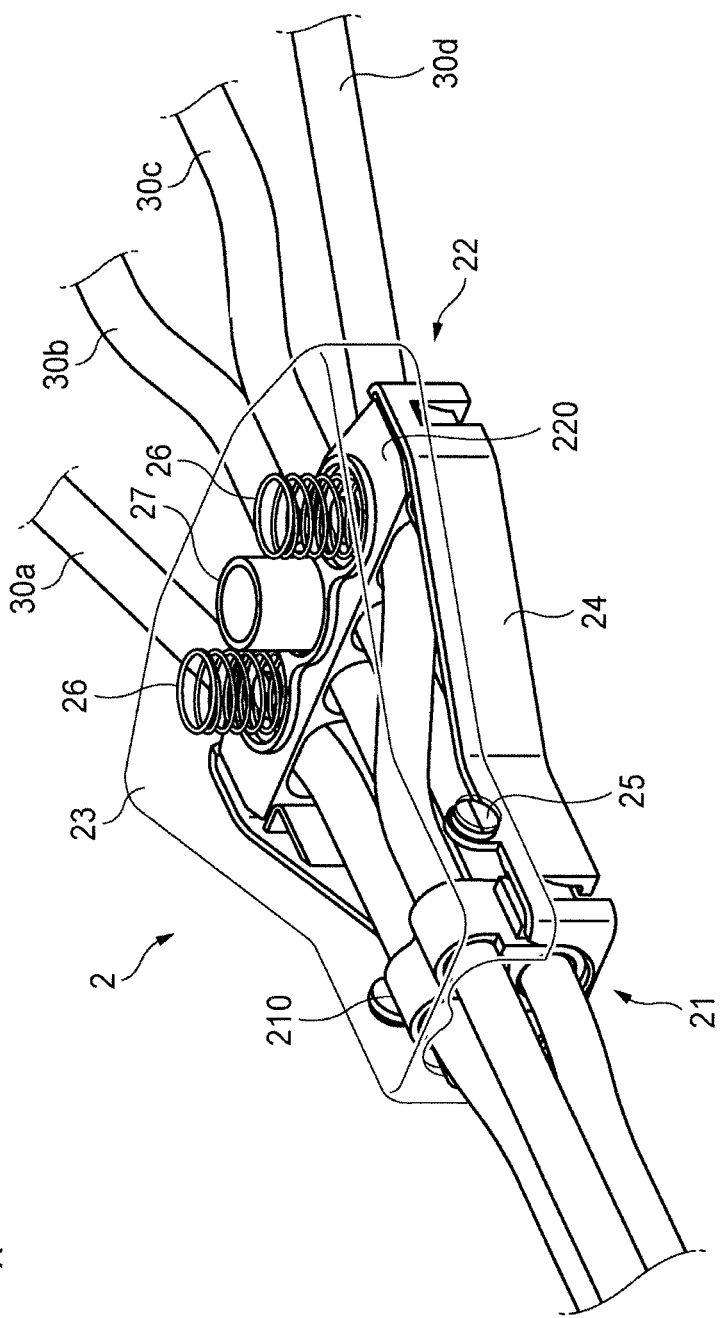
FIG. 8 is a perspective view of the branching module in which the plurality of cables are inserted.

Next, the details of the branching module 2 will be described with reference to FIGS. 6-8. FIGS. 6 and 7 are a perspective view and an exploded perspective view of the branching module 2, respectively. FIG. 8 is a perspective view of the branching module 2 in which the plurality of cables 30a-30d are inserted.

As shown in FIGS. 6 and 7, the branching module 2 is equipped with a first cable insertion portion 21, a second cable insertion portion 22, a movable cover 23, a fixed cover 24, a rotation point 25, two springs 26 (elastic members), and a spacer 27.

As shown in FIG. 7, the first cable insertion portion 21 has a first cable organizer 210, which has plural first insertion passages 212, step portions 213, and latches 214. The first insertion passages 212, which are through-holes, are arranged in two stages in the Y-axis direction and in two rows in the X-axis direction. The outer diameter of the first insertion passages 212 is larger than that of the cables 30. The plurality of cables 30a-30d are inserted in the respective first insertion passages 212 (see FIG. 8). The step portions 213 are formed so as to be continuous with the two respective upper-stage first insertion passages 212. The first cable organizer 210 is fixed to the fixed cover 24 when the latches 214 are engaged with respective lock portions 244 of the fixed cover 24.

The second cable insertion portion 22 has a second cable organizer 220, which has plural second insertion passages 222 and latches 223. The second insertion passages 222, which are through-holes having open bottoms, are arranged in one stage in the Y-axis direction and in four rows in the X-axis direction. The plurality of cables 30a-30d are inserted in the respective second insertion passages 222 (see FIG. 8). The second cable organizer 220 is fixed to the fixed cover 24 when the latches 223 are engaged with respective lock portions 243 of the fixed cover 24.

In a state that the second cable organizer 220 is fixed to the fixed cover 24, the plurality of second insertion passages 222 are in contact with the fixed cover 24. Thus, the respective open bottoms of the plurality of second insertion passages 222 are closed by the fixed cover 24. Although in the embodiment the first cable organizer 210 and the second cable organizer 220 are separate members, they may be implemented as a unitized member.

The rotation point 25 is disposed between the first cable insertion portion 21 and the second cable insertion portion 22 in the Z-axis direction, and connects the movable cover 23 to the fixed cover 24 rotatably.

The springs 26 are disposed between the movable cover 23 and the fixed cover 24 in the Y-axis direction. In the Z-axis direction, the springs 26 are disposed so as to be distant from the rotation point 25 and adjacent to the second cable insertion portion 22. In particular, the springs 26 are disposed between the movable cover 23 and the second cable organizer 220 in the Y-axis direction. The spacer 27 is disposed between the springs 26 in the X-axis direction, and between the movable cover 23 and the second cable organizer 220 in the Y-axis direction.

As shown in FIG. 8, the cables 30a-30d are arranged in such a manner that the interval between the cables 30a and 30d located at the ends in the X-axis direction increases as the position goes from the first cable insertion portion 21 to the second cable insertion portion 22. The cables 30a-30d are inserted in the first cable insertion portion 21 in bundled form in two stages, and lead out of the second cable insertion portion 22 so as to be arranged in one stage.

As such, the branching module 2 is configured so as to convert the arrangement of the cables 30a-30d from two stages to one stage.

The first cable organizer 210 and the second cable organizer 220 can determine the intervals between the adjoining ones of the separated cables 30 and fix the routes of the respective cables 30 in the branching module 2. As a result, the cables 30 are not entangled with each other even when the branching module 2 is moved relative to the plurality of cables 30.

The first insertion passages 212 of the first cable organizer 210 are arranged in two stages and the second insertion passages 222 of the second cable organizer 220 are arranged in one stage. As a result, the second cable organizer 220 can be made thinner in the Y-axis direction than the first cable organizer 210. Furthermore, since the springs 26 and the spacer 27 are disposed between the movable cover 23 and the second cable organizer 220, the branching module 2 can be miniaturized as a whole.

Figure 10:
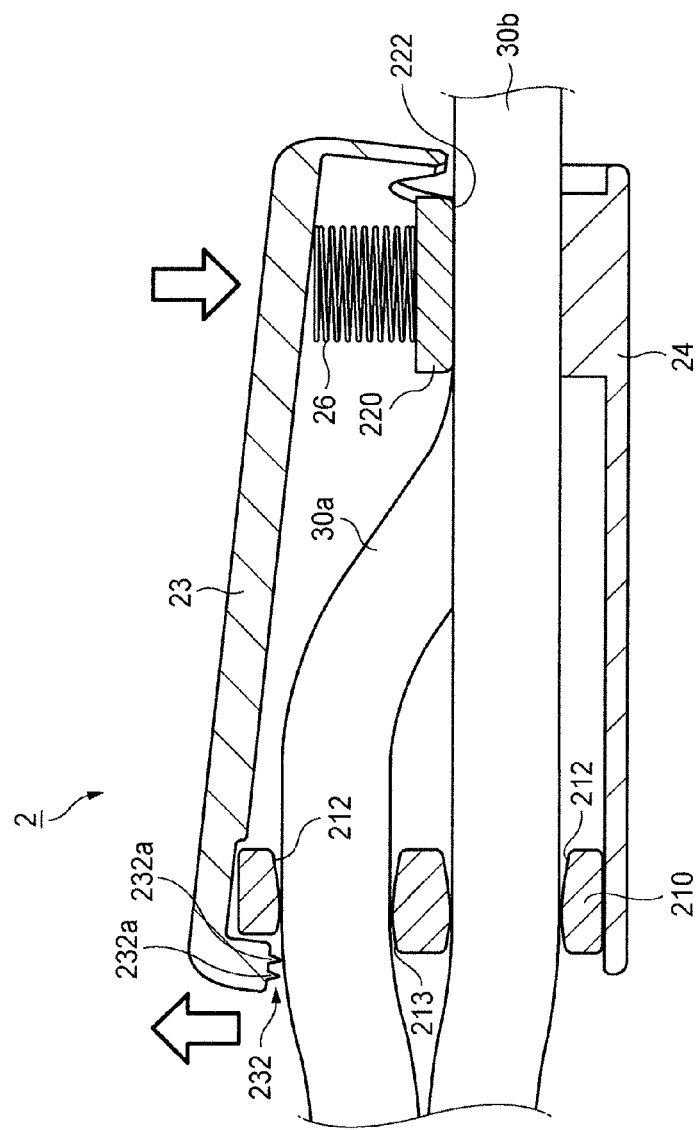
FIG. 10 is a sectional views taken perpendicularly to the X-axis direction and showing the branching module being in a second state.

Next, the workings of the branching module 2 which can switch between a first state and a second state will be described with reference to FIGS. 9 and 10. FIGS. 9 and 10 are sectional views taken perpendicularly to the X-axis direction and showing the branching module 2 being in the first state and the second state, respectively. As mentioned above, the first state is a state that the branching module 2 is fixed to at least one of the cables 30a-30d and the second state is a state that the branching module 2 is movable relative to the cables 30a-30d.

As shown in FIG. 9, when the branching module 2 is in the first state, the springs 26 are expanded in the +Y direction, whereby force acts in the +Y direction on a portion, located on the side of the second cable insertion portion 22, of the movable cover 23. And force acts in the −Y direction on a portion, located on the side of the first cable insertion portion 21, of the movable cover 23 via the rotation point 25 (see FIG. 7). As a result, a pressing portion 232 of the movable cover 23 exerts pressing forces on the cables 30a and 30d in the upper stage (the cable 30d is not shown in FIG. 9).

As a result, the movable cover 23 is fixed to the upper-stage cables 30a and 30d by the elastic forces of the springs 26 in the state that the cables 30a-30d are inserted in the respective first insertion passages 212. Since the cables 30a and 30d are fixed by the movable cover 23 in the state that they are sandwiched between movable cover 23 and the step portions 213, the branching module 2 can be fixed to the cables 30a and 30d securely.

As described above, the branching module 2 can be rendered in the first state by the elastic forces of the springs 26. In particular, the movable cover 23 is fixed to the cables 30a and 30d by the elastic forces of the springs 26, whereby the branching module 2 can be rendered in the first state.

The pressing portion 232 may have projections 232a, which makes it possible to concentrate the pressing forces of the pressing portion 232 on portions of the cables 30a and 30d.

On the other hand, as shown in FIG. 10, when a user pushes a portion, located on the side of the second cable insertion portion 22, of the movable cover 23, the springs 26 contract in the −Y direction. And force acts in the +Y direction on a portion, located on the side of the first cable insertion portion 21, of the movable cover 23 via the rotation point 25. As a result, the pressing portion 232 is separated from the cables 30a and 30d and the branching module 2 is rendered in the second state.

As described above, when the springs 26 is contracted by a user manipulation, the movable cover 23 is made movable relative to the cables 30a-30d. The state of the branching module 2 can be changed from the first state to the second state by a simple manipulation of pushing a portion, located on the side of the second cable insertion portion 22, of the movable cover 23 toward the fixed cover 24.

Since the spacer 27 is disposed between the movable cover 23 and the second cable organizer 220 in the Y-axis direction, the movable cover 23 comes into contact with the spacer 27 when a portion, located on the side of the second cable insertion portion 22, of the movable cover 23 is pushed. This prevents the bottom end of the movable cover 23 from touching portions, leading out of the second cable organizer 220, of the cables 30*a*-30*d*. The height of the spacer 27 is set properly taking this feature into consideration.

According to the embodiment, the branching module 2 can be moved along the cable module 3 while a portion, located on the side of the second cable insertion portion 22, of the movable cover 23 is pushed in the −Y direction. On the other hand, the branching module 2 can be fixed to the cable module 3 while no force is exerted on the movable cover 23.

Therefore, the position of the branching module 2 can be changed properly according to a positional relationship between the first host apparatus and the second host apparatus. Thus, the wiring member 1 can be provided in which the branching position of the cable module 3 can be adjusted.

Although the embodiment of the invention has been described above, it goes without saying that the description of the embodiment should not cause a restricted construction of the technical scope of the invention. The embodiment is just an example, and those skilled in the art would understand that the embodiment can be modified in various manners within the scope of the invention as described in the claims. As such, the technical scope of the invention should be defined on the basis of the scope of the invention as described in the claims and its equivalents.

An example modification will be described below. In the embodiment, the branching module 2 is equipped with the rotation point 25 which connect the movable cover 23 to the fixed cover 24 rotatably. The movable cover 23 is fixed to the cables 30*a* and 30*b* when the springs 26 expand, and is made movable relative to the cables 30*a*-30*d* when the springs 26 are contracted. That is, the branching module 2 is rendered in the first state when the springs 26 expand, and is rendered in the second state when the springs 26 are contracted.

However, the technical scope of the invention is not restricted so as to include this structure. For example, a structure is possible in which the branching module 2 does not have the rotation point 25. In this case, the movable cover 23 is fixed to the cables 30*a* and 30*b* when the springs 26 are contracted, and is made movable relative to the cables 30*a*-30*d* when the springs 26 expand. That is, the branching module 2 is rendered in a first state when the springs 26 are contracted, and is rendered in a second state when the springs 26 expand. With this structure, the branching module 2 is switched from the first state to the second state when a user lifts up the movable cover 23 in the +Y direction.

What is claimed is:

1. A wiring member comprising:
    a first module having a first communication unit which is electrically connected to a first host apparatus;
    plural second modules having respective second communication units which are electrically connected to a second host apparatus;
    a cable module having plural cables which connect the first communication unit to the second communication units; and
    a branching module which is disposed at a prescribed position in the cable module, which has a first cable insertion portion in which the plurality of cables are inserted in a bundled form and a second cable insertion portion in which the plurality of cables are inserted separately, and which is configured to be fixed to at least one of the plurality of cables in a first state and is configured to be movable relative to the plurality of cables in a second state, wherein:
    one end portions of the plurality of cables are connected to the first module in the bundled form and the other end portions of the plurality of cables are connected to the respective second modules separately,
    wherein the branching module further comprises an elastic member, and the branching module is fixed to at least one of the plurality of cables by an elastic force of the elastic member, wherein:
        the branching module further comprises:
            a fixed cover;
            a movable cover; and
            a rotation point which is disposed between the first cable insertion portion and the second cable insertion portion and connect the movable cover to the fixed cover rotatably;
        the elastic member is disposed between the movable cover and the fixed cover; and
        the movable cover is fixed to the at least one of the plurality of cables by the elastic force of the elastic member.

2. The wiring member according to claim 1, wherein:
    the elastic member is disposed between the rotation point and the second cable insertion portion; and
    the movable cover is configured to be fixed to the at least one of the plurality of cables when the elastic member expands, and is configured to be movable relative to the plurality of cables when the elastic member is contracted.

3. The wiring member according to claim 2, wherein:
    the first cable insertion portion has a first cable organizer having plural first insertion passages in which the plurality of respective cables are inserted; and
    the second cable insertion portion has a second cable organizer having plural second insertion passages in which the plurality of respective cables are inserted.

4. The wiring member according to claim 3, wherein:
    the plurality of cables are inserted in the first cable insertion portion in such a manner as to be bundled together in two stages.

5. The wiring member according to claim 4, wherein:
    the first cable organizer has a step portion that is continuous with at least one of the plurality of first insertion passages; and
    the at least one of the plurality of cables is fixed to the movable cover so as to be sandwiched between the movable cover and the step portion.

6. The wiring member according to claim 4, wherein:
    the plural first insertion passages are arranged in two stages;
    the plural second insertion passages are arranged in one stage;
    the plurality of second insertion passages are in contact with the fixed cover; and
    the elastic member is disposed between the movable cover and the second cable organizer.

7. The wiring member according to claim 4, wherein:
the first cable organizer has a step portion that is continuous with at least one of the plurality of first insertion passages;
the at least one of the plurality of cables is fixed to the movable cover so as to be sandwiched between the movable cover and the step portion;
the plural first insertion passages are arranged in two stages;
the plural second insertion passages are arranged in one stage;
the plurality of second insertion passages are in contact with the fixed cover; and
the elastic member is disposed between the movable cover and the second cable organizer.

8. A wiring member comprising:
a first module having a first communication unit which is electrically connected to a first host apparatus;
plural second modules having respective second communication units which are electrically connected to a second host apparatus;
a cable module having plural cables which connect the first communication unit to the second communication units; and
a branching module which is disposed at a prescribed position in the cable module, which has a first cable insertion portion in which the plurality of cables are inserted in a bundled form and a second cable insertion portion in which the plurality of cables are inserted separately, and which is configured to be fixed to at least one of the plurality of cables in a first state and is configured to be movable relative to the plurality of cables in a second state, wherein:
one end portions of the plurality of cables are connected to the first module in the bundled form and the other end portions of the plurality of cables are connected to the respective second modules separately,
wherein:
the branching module further comprises:
a fixed cover;
a movable cover; and
an elastic member disposed between the movable cover and the fixed cover;
the movable cover is fixed to the at least one of the plurality of cables by an elastic force of the elastic member in a state that the plurality of cables are inserted in the respective first insertion passages; and
the fixed cover, the movable cover and the elastic member are configured to be movable simultaneously relative to the plurality of cables in the second state.

9. The wiring member according to claim 8, wherein:
the first cable insertion portion has a first cable organizer having plural first insertion passages in which the plurality of respective cables are inserted; and
the second cable insertion portion has a second cable organizer having plural second insertion passages in which the plurality of respective cables are inserted.

* * * * *